United States Patent [19]

Tsurumi et al.

[11] Patent Number: 4,954,474
[45] Date of Patent: Sep. 4, 1990

[54] PROCESS FOR PREPARING CATALYSTS BY ALLOYING METALS ON SUPPORTS

[75] Inventors: Kazunori Tsurumi, Tokyo; Toshihide Nakamura, Funabashi; Akira Sato, Misato, all of Japan

[73] Assignee: Tanaka Kikinzoku Kogyo K.K., Japan

[21] Appl. No.: 312,671

[22] Filed: Feb. 17, 1989

[30] Foreign Application Priority Data

Feb. 18, 1988 [JP] Japan .................................. 63-36250

[51] Int. Cl.$^5$ .......................... B01J 21/18; B01J 23/64; B01J 23/89; H01M 4/88
[52] U.S. Cl. ....................................... 502/185; 429/40; 429/44; 502/101; 502/182; 502/313; 502/326; 502/327
[58] Field of Search ............... 502/184, 185, 101, 313, 502/326, 327, 182

[56] References Cited

U.S. PATENT DOCUMENTS

| 4,202,934 | 5/1980 | Jalan ..................................... | 502/185 |
| 4,394,299 | 7/1983 | Puskas et al. ......................... | 502/185 |
| 4,806,515 | 2/1989 | Luczak et al. ........................ | 502/185 |

Primary Examiner—Paul E. Konopka
Attorney, Agent, or Firm—Klauber & Jackson

[57] ABSTRACT

Disclosed herein is a process for alloying metals on inorganic supports comprising applying the solution of an organic acid amine salt of a second metal onto the inorganic supports already supported with a first metal; reducing the salt to the corresponding metal; and alloying the metals by heating.

According to the present invention, the alloying of the metals can be performed at a relatively low temperature. Therefore, a highly active binary or ternary catalyst having a large surface area can be obtained.

6 Claims, No Drawings

PROCESS FOR PREPARING CATALYSTS BY ALLOYING METALS ON SUPPORTS

BACKGROUND OF THE INVENTION

This invention relates to a process for alloying metals on supports for preparing a catalyst in which two or more metals are supported on the supports in the alloyed state. The process comprises adding a second metal onto the supports on which a first metal has been already supported and alloying the metals at a relatively low temperature.

Catalysts comprising carbon supports or inorganic oxide supports such as silica, and various catalyst metals, mainly a platinum metal, supported thereon have heretofore been employed as those for various chemical reactions and for the electrodes of fuel cells. A number of other catalysts which contain other metals such as nickel and chromium in addition to the platinum have been known for promoting the catalyst performance.

The catalyst performance of these catalysts depends on the degree of dispersion of the catalyst metals and the performance is promoted with the increase of the surface area of the catalyst if the same amount of the talyst is supported thereon. Although it is preferable to alloy the metals in the catalyst consisting of single supports and of a plurality of catalyst metals supported thereon, high degree of dispersion can not be obtained due to agglomeration of the metals if the alloying is performed at a high temperature. Once the metals are agglomerated, they can not be dispersed again for recovering the activity.

The present inventor is proposing a catalyst and a process for preparing the same in an application filed on the same day of the present application. The catalyst metals of the said catalyst seldom agglomerate with each other even if the catalyst is employed in a catalytic reaction at a high temperature, by carburizing a plurality of metals supported on carbon supports at high degree of dispersion to enhance the affinity between the supports and the metals.

However, even in this catalyst, no effect is obtained unless a plurality of the metals prior to the carburizing are highly dispersed, even if the movement of the metals from the fixed positions is prevented, because the activity before the movement is not high.

It has been heretofore required to develop a process which enables the highly dispersed metal supporting or the agglomeration of low degree when a plurality of metals are supported onto supports.

SUMMARY OF THE INVENTION

Accordingly, it is an object of this invention to provide a process for supporting a plurality of metals on supports at high degree of dispersion for overcoming the above drawbacks.

In accordance with one aspect of this invention, there is provided a process for alloying metals on inorganic supports comprising: applying the solution of an organic acid amine salt of a second metal onto the inorganic supports already supported with a first metal; reducing the salt to the corresponding metal; and alloying the metals by heating.

The most characteristic feature of this invention is in that, when the second metal is supported onto the inorganic supports on which the first metal has been already supported, the first metal and the second metal are alloyed on the supports with little agglomeration by heating to a relatively low temperature after the organic acid amine salt of the second metal is added and reduced.

DETAILED DESCRIPTION OF THE INVENTION

In the present invention, the catalyst supports are not particularly limited. It is preferable to employ carbon supports of which a main component is a carbon element having any form such as carbon black, graphite and activated carbon; or fire-resistant inorganic oxide supports such as silica and alumina. Of course, these supports preferably have a large surface area, for example, 30 to 2000 $m^2/g$ of a surface area, and have 100 to 5000 Å of a particle size.

In this invention, the supports onto which the first metal has already been supported are used, and then the second metal is supported thereon.

Such a noble metal as platinum, gold and palladium; and such a base metal as nickel, cobalt, chromium, iron and manganese can be employed as the above metals. Only one metal or the combination of two or more metals can be employed as the first and the second metals.

Concrete combinations include platinum-nickel, platinum-cobalt, platinum-chromium, platinum-iron, platinum-nickel-cobalt, platinum-chromium-cobalt, platinum-chromium-nickel, platinum-iron-cobalt, platinum-iron-nickel, platinum-iron-chromium, platinum-iron-manganese, platinum-nickel-manganese and the like. Either metal may be the first metal or the second metal.

An example will be described wherein platinum is the first metal and nickel and cobalt are the second metals.

As described earlier, the supports onto which the first metal has been already is used in this invention. Although the supporting process of the first metal onto the supports is not particularly restricted, the high degree of dispersion of the catalyst metals, even if the catalyst is prepared according to the present invention by supporting and alloying the second metal, can not be obtained if the supporting state of the first metal is bad, that is, the degree of agglomeration is high and the surface area is small. Therefore, the supporting of the first metal is preferably performed by employing a process which enables the catalyst metals to be supported in relatively good supporting conditions. For example, the first metal, for instance, platinum is supported on the supports by reducing the salt of the first metal and depositing the first metal by employing the following relatively weak reducing agent.

After the solution of a platinum containing ion, for example, the aqueous solution of chloroplatinic acid is impregnated into the supports, the platinum containing ion is reduced with a relative weak reducing agent such as sodium thiosulfate, potassium thiosulfate, ammonium thiosulfate, sodium metabisulfite, potassium metabisulfite and ammonium metabisulfite, and the platinum metal is deposited onto the supports. The chloroplatinic acid may be reduced prior to the impregnation into the supports and the reduced platinum may be deposited onto the supports.

The sodium thiosulfate, potassium thiosulfate, ammonium thiosulfate, sodium metabisulfite, potassium metabisulfite or ammonium metabisulfite reacts with the platinum containing ion, that is, the chloroplatinic ion in the aqueous solution to form finely divided metal sol having a large surface area.

It seems that, in this reaction employing the sodium thiosulfate or the like, much finely divided sulfur sol may be formed by decomposition of a sulfur compound according to the following equation, which is known to occur in an acidic solution.

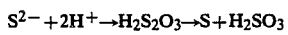
$$S^{2-} + 2H^+ \rightarrow H_2S_2O_3 \rightarrow S + H_2SO_3$$

The sulfur particles thus obtained serve as nuclei for growing much finely divided metal catalyst particles to form the highly dispersed platinum metal.

This sol is then adsorbed onto the supports to provide the supports supported with the platinum through appropriate procedures such as drying.

Since the thermodynamic driving force of the reaction between the chloroplatinic ion and the thiosulfate ion is smaller than that of the conventional art and fine crystal particles with less defects can be produced, the catalyst particles produced in this process is considered to have larger durability against a sintering reaction in which the surface area of platinum decreases with time. The fine particles having not more than 20 Å of a particle size can be obtained by the above mentioned reaction between the thiosulfate and the chloroplatinic acid.

Onto the inorganic supports onto which the first metal, for instance, platinum has been supported at a high degree of dispersion, the second metal, for example, nickel and cobalt is supported.

The nickel and cobalt salts of an organic acid amine, preferably of formamide or acetamide are employed to perform the supporting. These organic acid amine salts may be prepared by, for example, adding ammonium hydroxide to a warm aqueous solution containing nickel and cobalt formates or nickel and cobalt acetates. When an ordinary metal salt (e.g. nitrate) is heat-treated in a conventional process, high temperature reduction is necessary to alloy platinum with a fire-resistant oxide formed by the said heat-treatment so that the crystal growth (decrease of surface area) may occur prior to the alloying of the platinum. On the other hand, by the procedures of this invention, the metal salt can easily be reduced at a relatively low temperature with the minimum decrease of the surface area.

After impure metals in the metal salts are removed by extraction and dried if necessary, the metal salts are reduced in hydrogen for example at 250° C. for 30 minutes and then the reduced metals are alloyed at an elevated temperature e.g. 700° C.

In the case of preparing the ternary catalyst containing the platinum, the amount of the metal salts of the organic acid mines is so adjusted that 90 to 40 atomic % of the platinum and each of 5 to 30 atomic % of the second and third metals, most preferably 50 atomic % of the platinum and each 25 atomic % of the second and third metals are contained in the catalyst.

The catalyst thus prepared may be employed for various kinds of reactions or for fuel cell's electrodes without further treatment, or after the catalyst metals supported thereon can be carburized to enhance the affinity between the catalyst metals and the supports so as to depress the movement and agglomeration of the catalyst metals on the supports, if especially the supports are carbon supports.

When the second metal is made to be supported onto the inorganic supports onto which the first metal has been already supported to prepare the catalyst, the binary or ternary catalyst or the like can be prepared according to the present invention by impregnating the organic acid amine salt of the second metal into the inorganic supports, reducing the salt and the alloying the first and the second metals.

In the process of this invention, the organic acid amine salt of the second metal to be alloyed is employed in the alloying so that the metal which is formed by reducing the salt can be alloyed at a relatively low temperature without forming a fire-resistant oxide which requires a high temperature for alloying.

It is possible, in this invention, to obtain a highly active binary or ternary catalyst or the like having less agglomeration, that is, high dispersion and a large surface area because the alloying can be performed at a relatively low temperature.

Accordingly, the process of the present invention can be extensively employed for preparing various kinds of metal catalysts supported with a plurality of metals.

The present invention will now be described in detail in connection with the following Examples. However, these Examples are not intended to limit the scope of the present invention.

EXAMPLE 1

3 g of chloroplatinic acid was dissolved in 300 ml of water in a vessel of which a volume was 0.5 l. 10 ml out of 75 ml of water in which 3 g of $Na_2S_2O_3.5H_2O$ was dissolved was added dropwise into the above solution for 3 minutes and the rest of 65 ml was added all at once, and the solution was stirred at 27° C. With the lapse of time, the mixed solution became from yellow to orange, further to dark orange.

After the lapse of three hours, the room was darkened and the light of an electric bulb was applied to the vessel, then the scatter of the light was observed. 10 g of Acetylene Black for the catalyst supports was well suspended in 100 ml of pure water to form a slurry which was then added to the mixed solution. This suspended solution was stirred for two minutes with a supersonic agitator so that the solution was forced to penetrate into the pores of the supports. The slurry was kept to be suspended and did not precipitate during the stirring operation.

The slurry was dried in an oven at 75° to 80° C. overnight for removing water. The dry powders thus obtained were washed three times with about 200 ml of distilled water so that the byproducts were extracted and removed. This slurry was further dried at 70° C. to obtain the carbon supports supported with the platinum.

The platinum size of the platinum-carbon supports catalyst thus obtained was 18 Å by means of X-ray diffraction, and the the platinum particles were observed to have a uniform particle size by a transmission electron microscope. The specific surface area of the platinum was 155 m²/g according to an electrochemical hydrogen adsorption-desorption method, and the supported platinum was 10 weight %.

Then, to 100 ml of a nickel formate aqueous solution (1.54 mmol) was added an ammonium hydroxide aqueous solution until the pH of the solution reached 10, and the solution was stirred at 50° C. for 5 minutes. To the aqueous solution of the nickel salt of the formamide was added 3 g of the above platinum-carbon supports catalyst, and the solution was stirred at 50° C. for 10 minutes.

Thereafter, the slurry obtained was dried at 65° C. by evaporation. After the nickel salt was reduced to nickel by reducing the slurry in 10% of a hydrogen flow (the remainder was nitrogen) flowing at 1 l/minute at 250° C. for 30 minutes, the temperature of the atmosphere of the catalyst was raised to 800° C. so that the platinum and the nickel were alloyed with each other.

After the catalyst was observed by X-ray diffraction, the diffraction angle of the platinum was shifted to a higher angle side. This indicated that the platinum was alloyed with the nickel. The average particle size of the alloy calculated from the diffraction line width was 28 Å.

COMPARATIVE EXAMPLE 1

The supporting of the nickel onto the platinum-carbon supports catalyst of Example 1 was performed by immersing a nickel nitrate aqueous solution into the carbon catalyst. The supports were reduced and dried as Example 1.

After the thus obtained catalyst was observed by X-ray diffraction, the diffraction angle of the platinum was shifted to a higher angle side. This indicated that the platinum was alloyed with the nickel. However, the average particle size of the alloy was 33 Å.

EXAMPLE 2

100 ml of a cobalt acetate aqueous solution (1.54 mmol) was employed in place of the nickel formate aqueous solution of Example 1. An ammonium hydroxide aqueous solution was added to the cobalt acetate solution until the pH of the solution reached 10, and the solution was stirred at 50° C. for 5 minutes. To the aqueous solution of the cobalt salt of the acetamide was added 3 g of the carbon supports catalyst supported with only platinum which had been prepared according to the same procedures of Example 1 except that sodium metabisulfite was employed in place of the sodium thiosulfate. The mixture was stirred at 50° C. for 10 minutes.

After the slurry which had been prepared similarly to Example 1 was dried and reduced in a hydrogen flow so that the cobalt salt was reduced to cobalt, the temperature of the catalyst supports atmosphere was raised to 900° C. to alloy the platinum with the cobalt.

The average particle size of the platinum particles of the platinum-carbon supports catalyst thus prepared was 20 Å according to X-ray diffraction. The diffraction angle of the platinum after the alloying procedure was shifted to a higher angle side, which indicated the alloying with the cobalt. The average particle size of the alloy particles was 29 Å.

COMPARATIVE EXAMPLE 2

The supporting of the cobalt onto the platinum-carbon supports catalyst of Example 2 was performed employing a cobalt nitrate aqueous solution. After the solution was impregnated into the catalyst and the catalyst was dried, the temperature of the atmosphere was raised to 900° C. in a nitrogen flow at the rate of 1 l/minute so that the platinum and the cobalt were alloyed.

After the catalyst thus obtained was observed by X-ray diffraction, the diffraction angle of the platinum was shifted to a higher angle side, which indicated the alloying. However, the average particle size of the alloy was 35 Å.

EXAMPLE 3

A mixed solution of 50 ml of a chromium (III) acetate aqueous solution (0.77 mmol) and 50 ml of a cobalt acetate aqueous solution (0.77 mmol) was employed in place of the nickel formate aqueous solution of Example 1. An ammonium hydroxide aqueous solution was added to the mixed solution until the pH of the solution reached 10, and the solution was stirred at 50° C. for 5 minutes. Then, to the said aqueous solution of the chromium and cobalt salts of the acetamide was added 3 g of the carbon supports catalyst supported with only platinum which had been prepared according to the same procedures of Example 1, and it was stirred at 50° C. for 10 minutes. After the slurry which had been prepared similarly to Example 1 was dried and reduced in a hydrogen flow, the temperature of the catalyst atmosphere was raised to 900° C. and the catalyst was treated for one hour to alloy the platinum, the chromium and the cobalt.

After the catalyst thus obtained was observed by X-ray diffraction, the diffraction angle of the platinum was shifted to a higher angle side, which indicated the alloying. The average particle size of the platinum particles was 30 Å.

This platinum alloy carbon catalyst and a tetrafluoroethylene (hereinafter referred to as TFE) dispersion solution was kneaded so that the dispersion containing the catalyst and TFE in the weight proportion of 6:4 was prepared. The dispersion was applied onto a carbon sheet which had been hydrophobically treated, which was then sintered to provide an electrode of which platinum content was 0.5 mg/cm$^2$. After the electrode was incorporated in a half cell of which an electrolyte was 100% phosphoric acid, the current-potential characteristic as an air electrode was measured, the potential (no IR) was 735 mV at 200 mA/cm$^2$.

COMPARATIVE EXAMPLE 3

Ammonium chromate and cobalt nitrate were employed in place of the acetates of the chromium and the nickel. At first, after 3 g of the same platinum-carbon supports catalyst as that employed in Example 3 was dispersed in 150 g of water, aqueous ammonia was added to to the dispersion with 15 minutes' supersonic stirring so that the pH was adjusted to 8. Then, 15 ml of an ammonium chromate aqueous solution (0.77 mmol) was added to the dispersion and was stirred for 15 minutes. Thereafter, 15 ml of a cobalt nitrate aqueous solution (0.77 mmol) was further added and aqueous ammonia was added until the pH reached 5.5, and the dispersion was stirred for about 15 minutes.

After the dispersion was filtered and the obtained solid was dried at about 90° C. and ground, the solid was thermally treated for about one hour at 900° C. in a nitrogen flow flowing at 1 l/minute.

After the catalyst thus obtained was observed by X-ray diffraction, the diffraction angle of the platinum was shifted to a higher angle side, which indicated the alloying. The average particle size of the alloy particles was 38 Å.

After the half cell was assembled employing this platinum alloy carbon catalyst as in Example 3, the characteristic was measured to be 715 mV (no IR) at 200 mA/cm$^2$.

EXAMPLE 4

A platinum-nickel-cobalt alloy carbon catalyst was prepared by employing the same procedures as those of Example 3 except that nickel formate was employed in place of the chromium (III) acetate of Example 3. After the catalyst thus obtained was observed by X-ray diffraction, the diffraction angle of the platinum was shifted to a higher angle side, and the lattice constant of the alloy was about 3.85 Å compared to about 3.92 Å for that of pure platinum. The average particle size of this alloy was 32 Å.

After the half cell was assembled employing this platinum alloy carbon catalyst as in Example 3, the characteristic was measured to be 758 mV (no IR) at 200 mA/cm$^2$.

EXAMPLE 5

A platinum-nickel-cobalt alloy carbon catalyst was prepared by employing the same procedures as those of Example 4 except that the heat treatment temperature and time for alloying were different. The heat treatment for alloying was initially performed at 250° C. for 30 minutes in a 10% hydrogen flow (the remainder was nitrogen) flowing at 1 l/minute as in Example 4 for reducing, and was further performed at an elevated temperature of 700° C. for three hours.

The characteristics of the catalyst thus obtained were measured, similarly to Example 4, to be about 3.85 Å for the lattice constant of the platinum alloy and 34 Å for the alloy particle size. The current-potential characteristic of the half cell was 756 mV (no IR) at 200 mA/cm$^2$.

COMPARATIVE EXAMPLE 4

A platinum-nickel-cobalt alloy carbon catalyst was prepared by employing the same procedures as those of Comparative Example 3 except that nickel nitrate was employed in place of the ammonium chromate of Comparative Example 3. After the catalyst thus obtained was observed by X-ray diffraction, the diffraction angle of the platinum was shifted to a higher angle side and the lattice constant of the alloy was about 3.85 Å and the average particle size of the alloy was 40 Å. The characteristic of the half cell was 722 mV (no IR) at 200 mA/cm$^2$.

EXAMPLE 6

A platinum-chromium-nickel alloy carbon catalyst was prepared by employing the same procedures as those of Example 3 except that a nickel formate aqueous solution was employed in place of the cobalt acetate of Example 3. After the measurement was performed as in Example 3, the average alloy particle size was 33 Å and the characteristic of the half cell was 743 mV (no IR).

COMPARATIVE EXAMPLE 5

A platinum-chromium-nickel alloy carbon catalyst was prepared by employing the same procedures as those of Comparative Example 3 except that nickel nitrate was employed in place of the cobalt nitrate of Comparative Example 3. After the measurement was performed as in Example 3, the average alloy particle size was 39 Å and the characteristic of the half cell was 730 mV (no IR).

EXAMPLE 7

A palladium-nickel catalyst was prepared employing the same procedures as those of Example 1 except that a palladium chloride aqueous solution (35.7 mmol/l) was employed in place of the chloroplatinic acid aqueous solution. The average alloy particle size of the thus obtained catalyst was 25 Å.

EXAMPLE 8

A platinum-nickel catalyst was prepared employing the same procedures as those of Example 1 except that silica supports were employed in place of the carbon supports. The average alloy particle size of the thus obtained catalyst was 27 Å.

While the invention has been particularly set forth in terms of the specific embodiments thereof, it will be understood in view of the instant disclosure that numerous variations upon the invention are now enabled to those skilled in the art, which variations yet reside within the scope of the present teaching. Accordingly, the invention is to be broadly construed, and limited only by the scope and spirit of the claims appended thereto.

What is claimed is:

1. A process for preparing catalysts by alloying metals on inorganic supports comprising:
    applying a solution of an organic acid amine salt of a second metal onto the inorganic supports already supported with a first metal;
    reducing the salt to the corresponding metal; and
    alloying the metals by heating.

2. A process as defined as claim 1, wherein the inorganic supports are carbon supports.

3. A process as defined as claim 1, wherein the inorganic supports are inorganic oxide supports.

4. A process as defined as claim 1, wherein the first metal is platinum and the second metal is one or more metals selected from the group consisting of nickel, cobalt, chromium and iron.

5. A process as defined as claim 1, wherein the organic amine salt is a formamide salt and/or an acetamide salt.

6. A process as defined as claim 1, wherein the reduction of the organic acid amine salt is performed in a hydrogen flow.

* * * * *